United States Patent Office 2,938,016
Patented May 24, 1960

2,938,016

OLEFIN/MALEIC ANHYDRIDE COPOLYMERS OF LOW MOLECULAR WEIGHT

John H. Johnson, Dayton, Ohio, assignor to Monsanto Chemical Company, St. Louis, Mo., a corporation of Delaware No Drawing. Filed Aug. 10, 1956, Ser. No. 603,211

17 Claims. (Cl. 260—78.5)

This invention relates to the production of low molecular weight olefin/maleic anhydride copolymers. In some of its aspects the invention pertains to the copolymerization of maleic anhydride with ethylene and/or propylene and/or butene in the presence of particular materials which result in the production of low molecular weight copolymers, particularly ethylene/maleic anhydride copolymers having a specific viscosity not in excess of 0.2 as determined on a solution of one weight percent of the copolymer in dimethylformamide at 25° C.

Copolymers of maleic anhydride with all sorts of copolymerizable unsaturated organic compounds have been known for many years. It is known to copolymerize maleic anhydride with the lower olefin hydrocarbons, the resulting copolymers containing substantially equimolar proportions of maleic anhydride and the olefin combined therein. The copolymerization is advantageously effected by subjecting a solution of maleic anhydride in an organic diluent, e.g., benzene, to a superatmospheric olefin pressure, employing a peroxide catalyst and elevated temperatures. In many instances where a comparatively high molecular weight copolymer is desired, this procedure is adequate. However, it has been found difficult to produce low molecular weight olefin/maleic anhydride copolymers, which find various uses such as deflocculants and thinners for drilling muds and dispersants for pigments. While especially elevated temperatures, e.g., those above 100° C., tend to result in a product of lowered molecular weight, the physical form is not desirable; it appears that the high temperatures cause a softening of the copolymer product which forms as a more or less insoluble solid in suspension in the diluent or solvent used, and the softened particles of polymer tend to agglomerate, as well as accumulate on the walls of the reaction vessel and stirrer, if any is used. While for many polymerizations an increase in the amount of catalyst causes a decrease in molecular weight of the polymer, this particular system is not very sensitive to catalyst concentration at least insofar as reflected in a change in molecular weight.

In accordance with the present invention in preferred aspects, the copolymerization of maleic anhydride with a $C_2$ to $C_4$ olefin is effected in the presence of an aldehyde having the formula

wherein R is selected from the group consisting of hydrogen, hydrocarbon radicals, and aldehyde-substituted hydrocarbon radicals. Those having at least one hydrogen atom on the α-carbon atom, i.e., on the carbon atom attached to the —CHO group, are preferred; such compounds wherein R is alkyl are often most conveniently used, and can be termed alkanals having at least one hydrogen atom on the α-carbon atom. Other preferred aldehydes are those in which the α-carbon atom has one or two hydrogen atoms and also is substituted by an aryl radical through aromatic carbon. The materials employed in the invention can be generally described as aldehydes free from non-hydrocarbon substituents. While aldehydes having more than one aldehyde group in the molecule, e.g., dialdehydes, trialdehydes, etc., can be used, such polyaldehydes are often difficult to manufacture and/or store; hence the monoaldehydes are almost always preferred.

The aldehydes employed in the present invention permit the production of ethylene/maleic anhydride copolymers, propylene/maleic anhydride copolymers, and butene/maleic anhydride copolymers, having low molecular weights desired for certain purposes, and have marked advantages over certain other types of compounds which also result in the production of low molecular weight copolymers in that the yield is only moderately reduced at a given concentration of catalyst, usually a peroxide, and essentially theoretical yields are readily obtained by only modest increases in the concentration of the catalyst.

By way of example, but not limitation, of suitable aldehydes that can be employed in practicing the present invention, there are mentioned: formaldehyde, acetaldehyde, propionaldehyde, n-butyraldehyde, isobutyraldehyde, trimethylacetaldehyde, iso-valeric aldehyde, stearaldehyde, phenylacetaldehyde, diphenylacetaldehyde, cyclohexylformaldehyde, $\Delta^3$-cyclohexenylformaldehyde, 4-penten-1-al, glyoxal, benzaldehyde, α-naphthaldehyde, β-naphthylacetaldehyde, m-phthaldehyde, p-phenylene-bis-(acetaldehyde), "Oxo" aldehydes, i.e., aldehydes derived by reaction of olefin hydrocarbons with CO and $H_2$ by the "Oxo" process, and especially when the olefin is a polymer or mixed polymers of propylene and/or isobutylene, e.g., such polymers containing from 8 to 16 carbon atoms. There is usually no advantage in the aldehydes having more than 25 carbon atoms per molecule, and those having from 2 to 15 carbon atoms per molecule are preferred.

The quantity of the particular aldehyde employed will fall within a rather wide range. A preferred range is from 0.5 to 20 mole percent of the aldehyde, based on the reacting monomers (assuming 100% conversion) i.e., from 0.5 to 20 moles of the aldehyde per 50 moles maleic anhydride charged (50 moles maleic anhydride will theoretically react with 50 moles of the olefin, thus making 100 moles of "reacting monomers"). The same basis is meant herein when mole percent catalyst is mentioned. For most purposes I prefer to use from 3 to 10 mole percent of the aldehyde. At otherwise fixed reaction conditions, the higher the percentage of a given aldehyde the lower the molecular weight of the resulting copolymer. The amount of aldehyde used is one of several interdependent reaction variables which affect the molecular weight of the product. The more important of the other such variables are the reaction temperature and the reaction pressure (upon which the hydrocarbon monomer concentration depends). In general, the higher the temperature, the lower the molecular weight, and the higher the pressure, the higher the molecular weight. However, the temperature should not be increased too much for the reasons discussed hereinabove. Also, the pressure should not be lowered too much or the yield of copolymer tends to decrease to an undue extent. Lower pressures are more suitable in the cases of propylene and isobutylene copolymers where the vapor pressures of the olefin at a given temperature are lower than in the case of ethylene. I prefer to employ a reaction temperature within the range of 40 to 80° C., and 60 to 80° C. is especially advantageous. At such temperatures, the reaction rate is good and the physical form of the copolymer product is good. The reaction pressure can be atmospheric or below, but is preferably super-atmospheric. It is preferred that the reaction be carried out in a closed vessel such as a stirred autoclave, rocking bomb, tubular reactor through which reaction mixture flows, or the like, at a pressure above atmospheric pressure. The pressure is preferably above 100 pounds per square inch gauge for the preparation of ethylene/maleic anhydride copolymers, and pressures of 150 to 400 pounds per square inch gauge are especially preferred. However, even higher pressures, say up to 1000 pounds per square inch gauge and above, are permissible. As pointed out hereinafter, in general, the higher the pressure the higher the molecular weight and hence the greater the quantity of aldehyde required.

The olefin reactant can be a single olefin or a mixture of any two or more of the olefins ethylene, propylene, isobutylene, butene-1, butene-2-cis, and butene-2-trans. Preferred olefins are ethylene, propylene and isobutylene. While the maleic anhydride copolymers of these olefins have many attributes in common, there are also important differences among the products as well as among the optimum ranges of reaction conditions to be employed in making them. Thus reaction pressures can be significantly lower when higher boiling olefin monomers are used. For example, adequate olefin monomer concentration can be obtained at pressures ranging from 50–200 p.s.i. when propylene is involved; with isobutylene, essentially atmospheric pressures are sufficient, but higher pressures can be used. The properties of the copolymers differ markedly with the olefin monomer with particular reference to acid strength of the copolymers which have been hydrolyzed to the free acid form and chemical reactivity of both the anhydride and the acids. In general, the greater the degree of substitution on the ethylene group, the lesser are both acid strengths and chemical reactivity (i.e., ease of esterification, etc.). The invention will be discussed in more detail referring to ethylene/maleic anhydride copolymers by way of example, and application of same to the other olefins will be apparent, bearing in mind the foregoing comments.

The copolymer product contains essentially one mole of total olefin per one mole of maleic anhydride combined therein, irrespective of the relative proportions of ethylene or other olefin or mixture of olefins on the one hand, and maleic anhydride on the other hand, introduced to the reaction system. The ratio of free olefin, e.g., ethylene, available for reaction, to free maleic anhydride available for reaction, at any given time depends upon a variety of factors, including particularly the quantity of free maleic anhydride dissolved in the solvent and the quantity of ethylene dissolved in the solvent. The latter value in turn depends upon the solubility of ethylene in the reaction mixture, which is a function of the particular solvent, the temperature, the pressure, and the concentration of maleic anhydride in the solvent. It is much preferred that by the time the reaction has been completed, an excess of ethylene over that required to react with the entire quantity of maleic anhydride shall have been furnished to the reaction mixture, so as to give maximum utilization of the maleic anhydride. (This is less necessary with propylene and isobutylene, and with these olefins, especially the latter, an effective manner of operating is to charge initially all the maleic anhydride and less than the stoichiometric amount of olefin and intermittently or continuously add olefin until the total charged is just equal to or slightly more than the stoichiometric quantity.) Any unreacted ethylene is readily recovered and recycled to the reaction. The ethylene, maleic anhydride, solvent or diluent, and aldehyde can be brought together in various ways, but in any event thorough intermixture of same should be provided. Thus, the reaction can be conducted in a batch, into which ethylene is continuously or intermittently added to maintain pressure until all the maleic anhydride is used up by copolymerization. A similar operation can be conducted wherein maleic anhydride is added continuously or intermittently. The components of the reaction mixture can be continuously fed into a stirred autoclave with continuous overflow of total reaction mixture out of the autoclave either to recovery steps or through a series of autoclaves. A total reaction mixture can be passed through an elongated reaction tube, with ethylene and/or maleic anhydride and/or catalyst and/or aldehyde being added at one or more points along the length of the tube if desired.

It is most convenient to carry out the reaction in the presence of an organic solvent for the maleic anhydride. Such solvent is preferably also a non-solvent for the copolymer product. Such materials which can be termed solvents or diluents are advantageously aliphatic or aromatic hydrocarbons or chlorinated hydrocarbons, for example, benzene, toluene, xylene, n-hexane, mixed hexanes, octane, ethylene dichloride, propylene dichloride, chlorobenzene, the dichlorobenzenes, and the like. Since the solvent preferably has a high capacity for dissolving maleic anhydride, it is desirable when a poor solvent for maleic anhydride, such as hexane, is employed to have mixed therewith a good solvent for maleic anhydride, such as ethylene dichloride or benzene. While the proportion of the total solvent to the other components of the reaction mixture can be varied over a wide range, it is preferred to employ an amount such that the final reaction mixture will have a solids content (calculated on the assumption that all maleic anhydride has copolymerized) within the range of 5 to 30 weight percent.

The copolymerization is effected in the presence of a catalyst of free-radical promoting type, principal among which are peroxide-type polymerization catalysts and azo-type polymerization catalysts. Those skilled in the art are now fully familiar with a large number of peroxide-type polymerization catalysts and a suitable one can readily be chosen by simple trial. Such catalysts can be inorganic or organic, the latter having the general formula: R'OOR", wherein R' is an organic radical and R" is an organic radical or hydrogen. These compounds are broadly termed peroxides, and in a more specific sense are hydroperoxides when R" is hydrogen. R' and R" can be hydrocarbon radicals or organic radicals substituted with a great variety of substituents. By way of example, suitable peroxide-type catalysts include: benzoyl peroxide, lauroyl peroxide, tertiary butyl peroxide, 2,4-dichlorobenzoyl peroxide, tertiary butyl hydroperoxide, diacetyl peroxide, diethylperoxycarbonate, dimethylphenylhydroperoxymethane (also known as cumene hydroperoxide), among the organic peroxides; hydrogen peroxide, potassium persulfate, perborates and other "per" compounds among the inorganic peroxides. The azo-type polymerization catalysts are also well known to those skilled in the art. These are characterized by the presence in the molecule of the group —N=N— wherein the indicated valences can be attached to a wide variety of organic radicals, at least one, however, preferably being attached to a tertiary carbon atom. By way of example of suitable azo-type catalysts can be mentioned α,α'-azodiisobutyronitrile, p-bromobenzenediazonium fluoborate, N-nitrosop-bromoacetanilide, azomethane, phenyldiazonium halides, diazoaminobenzene, p-bromobenzenediazonium hydroxide, p-tolyl diazoaminobenzene. The peroxy-type or azo-type or other free radical promoting type of polymerization catalyst is used in small but catalytic amounts, which generally are not in excess of 1 to 2 mole percent, based on the reacting monomers as above defined. A suitable quantity is often in the range of 0.1 to 1.0 mole percent.

It is an important advantage of the present invention that the aldehydes, while quite active in reducing the molecular weight of the copolymer product, do not seem to stop the chain transfer reaction to a severe extent and hence even with comparatively large amounts of the added aldehyde, it is necessary to increase the catalyst concentration only a very moderate amount. Further information is supplied in the examples given hereinafter.

The quantity of the aldehyde employed will be chosen which, in combination with the other reaction variables, will result in the production of an ethylene/maleic anhydride copolymer having a specific viscosity less than that obtained if the said aldehyde is not used. In general, the specific viscosity should be not in excess of about 0.3, as determined on a one weight percent solution of the copolymer product in dimethylformamide, the viscosity measurement being made at 25° C. The preferred range of specific viscosities for ethylene/maleic anhydride copolymers is from 0.05 to 0.2, and a value of less than 0.15 is preferred for most uses to which the copolymer may be put. Since there are certain inherent viscosity differences depending upon the olefin employed, the preferred range of specific viscosities for the aldehyde regulated copolymers will vary. This is due to the effects of olefin substitution upon the degree of coiling for the polymer chain which results in varying solution viscosities for different polymers of equivalent molecular weights. Thus, the preferred specific viscosity range for propylene/maleic anhydride copolymer is from 0.10 to 0.40 and for isobutylene/maleic anhydride copolymer from 0.20 to 1.0. To obtain polymers having these specific viscosities, the amount of aldehyde employed will in most cases be within the range of 1 to 20 mole percent based on reacting monomers as hereinabove defined. Any unreacted aldehyde remaining present in the final reaction mixture can be recovered and returned to the process for further use. A preferred embodiment of my invention involves separating the copolymer product by simple filtration, centrifuging, or the like from the total liquid (which includes solvent, aldehyde, and any unreacted maleic anhydride dissolved therein) and recycling the total liquid for further use in the polymerization process. Under these conditions very little of the aldehyde is used up.

The commercial form of maleic anhydride is satisfactory for use in the present invention. Where exposure to moisture has occurred and the maleic anhydride is contaminated with maleic acid, it is preferred to dissolve the material in the solvent to be used in the reaction, and separate by filtration or centrifuging or otherwise any maleic acid present, which is not dissolved by the solvent. In other words a maleic acid-free reaction mixture is preferred. As pointed out before, the copolymer product generally separates as a solid insoluble in the reaction mixture. It can be separated therefrom by centrifuging or filtration as desired, and then is preferably washed with a hot organic solvent for maleic anhydride, such as benzene at 100° F., sufficiently to remove any unreacted maleic anhydride from the copolymer product. The copolymer is then subjected to conventional drying procedure to remove any residual solvent. As an alternate procedure for isolation, the polymer slurry can be direct dried in a vacuum-pan drier.

The low molecular weight olefin/maleic anhydride copolymers produced by the practice of the present invention find particular use as dispersants in numerous industrial fields. They have been found to be outstanding in their ability to thin drilling muds, i.e., aqueous suspensions of clay or other finely divided inorganic solids used in the drilling of oil-wells. The low molecular weight copolymers are also dispersants for inorganic pigments, for clay slips used in the ceramics industry, for clay coatings for paper, and the like. The copolymer can be employed as such, i.e., in the anhydride form, and hydrolysis to the free acid or salt, if salt-forming materials are present, occurs in the aqueous medium in which the polymer is being used. Alternatively, the copolymer before use can first be converted to the free acid form by hydrolysis, or to the form of its alkali metal or other metal salts, ammonium salts, amine salts, partial or complete ester or amide, and the like, as may be desired for any particular purpose.

The following examples are provided to give an indication of suitable reactants, solvents, catalysts, and aldehydes, and proportions of same, as well as suitable temperature and pressure conditions for the copolymerization. However, it will be understood that variations from these specific examples can be made without departing from the invention.

EXAMPLES 1–18

The procedure and apparatus used in Examples 1 to 18 were as follows:

A three-liter rocking autoclave was charged with maleic anhydride dissolved in a solvent which was either benzene or ethylene dichloride, plus n-butyraldehyde (or isobutyraldehyde in Examples 10 and 18), plus benzoyl peroxide catalyst. The autoclave bomb was pressured to 100 pounds per square inch gauge (p.s.i.g.) with ethylene, rocked at room temperature for 10 minutes, and the ethylene vented. This was twice more repeated. By this flushing procedure the reaction mixture was freed of any dissolved air. The bomb was then charged with sufficient ethylene to give an estimated 200 p.s.i.g. (100 p.s.i.g. in Examples 13 and 14) pressure on heating to the chosen reaction temperature of 70° C. or 80° C.

Rocking of the bomb was started, and the contents brought up to reaction temperature by means of an electrically heated jacket. Additional ethylene was charged into the bomb from time to time to maintain the chosen pressure of 200 p.s.i.g. (100 p.s.i.g. in Examples 13 and 14). In most of the examples the run continued overnight so the total time was 16 to 24 hours; however, the copolymerization reaction was completed in from 10 to 20 hours, varying from example to example.

Unreacted ethylene was vented, the total reaction mixture was filtered, the separated ethylene/maleic anhydride copolymer was washed several times with benzene or ethylene dichloride while filtering, and the polymer was then dried at 100° C. for 24 hours under the full vacuum of a water aspirator. Yield was calculated as percent of theory, based on 100% of maleic anhydride being copolymerized with ethylene in 1:1 mole ratio.

The specific viscosity of the polymer product was determined by modification of ASTM Method D–445–46T, Method B, using an Ostwald type viscosimeter. The polymer was dissolved in 1 weight percent concentration in dimethylformamide, and the specific viscosity determined at 25° C.

The data for the examples, and also the data for controls wherein no aldehyde was employed, are given in Table I.

Table 1

PRODUCTION OF LOW MOLECULAR WEIGHT ETHYLENE/MALEIC ANHYDRIDE COPOLYMER WITH THE AID OF BUTYRALDEHYDES

| Example | Aldehyde, Wt. Percent [1] | Maleic Anhydride, grams | Solvent, ml. | Benzoyl Peroxide, mole Percent | Temp., °C. | EMA Copolymer Yield, Percent | EMA Copolymer Sp. Visc. | Comments |
|---|---|---|---|---|---|---|---|---|
| | | | Benzene | | | | | |
| ---- | 0 | 200 | 1,600 | 0.5 | 70 | 99.3 | 0.36 | Control. |
| ---- | 0 | 267 | 2,089 | 0.5 | 80 | 96.8 | 0.23 | Do. |
| 1 | 1.25 | 200 | 1,600 | 0.5 | 70 | 98.5 | 0.31 | |
| 2 | 1.40 | 200 | 1,600 | 0.5 | 70 | 97.3 | 0.25 | |
| 3 | 2.50 | 200 | 1,600 | 0.5 | 70 | 98.6 | 0.24 | |
| 4 | 5.00 | 200 | 1,600 | 0.5 | 70 | 98.1 | 0.18 | |
| 5 | 5.00 | 200 | 1,600 | 0.5 | 80 | 98.1 | 0.14 | |
| 6 | 7.00 | 200 | 1,600 | 0.5 | 80 | 97.4 | 0.12 | |
| 7 | 8.0 | 364 | 2,089 | 0.5 | 80 | 83.8 | 0.10 | 20% Solids. |
| 8 | 9.0 | 267 | 2,089 | 0.5 | 80 | 94.5 | 0.11 | |
| 9 | 10.9 | 267 | 2,089 | 0.75 | 80 | 93.0 | 0.09 | |
| 10 | 1.4 | 200 | 1,600 | 0.5 | 70 | 96.2 | 0.26 | Isobutyraldehyde. |
| | | | Ethylene Dichloride | | | | | |
| ---- | 0 | 267 | 2,089 | 0.5 | 80 | 97.2 | 0.16 | Control. |
| 11 | 9.0 | 267 | 2,089 | 0.5 | 80 | 78.2 | 0.11 | |
| 12 | 9.0 | 267 | 2,089 | 0.75 | 80 | 98.5 | 0.10 | |
| 13 | 9.0 | 267 | 2,089 | 0.75 | 80 | 79.6 | 0.08 | 100 p.s.i.g. |
| 14 | 9.0 | 267 | 2,089 | 1.5 | 80 | 95.9 | 0.07 | Do. |
| 15 | 10.0 | 364 | 2,089 | 1.0 | 80 | 98.3 | 0.10 | 20% Solids. |
| 16 | 10.9 | 267 | 2,089 | 0.75 | 80 | 96.9 | 0.10 | |
| 17 | 18.0 | 267 | 2,089 | 0.75 | 80 | 98.1 | 0.09 | |
| 18 | 10.9 | 267 | 2,089 | 0.75 | 80 | 92.4 | 0.09 | Isobutyraldehyde. |

[1] Wt. Percent = g. aldehyde per 100 g. "reacting monomers"; multiply by 0.875 to give mole percent aldehyde.

Examples 1 to 9 when compared with each other and with the controls show the lowering of molecular weight of the ethylene/maleic anhydride copolymer obtained by the use of n-butyraldehyde. As shown in Example 1, even 1.25 weight percent gives a definite lowering of viscosity as compared with the control wherein no aldehyde was employed. Increasing the amount up to 5% causes a continued and marked decrease in specific viscosity of the product. Comparison of Example 5 with Example 4 reveals that an increase of 10° C. in the reaction temperature causes a definite decrease in the molecular weight of the product. Proceeding to Example 6, increasing the percentage n-butyraldehyde from 5 to 7 percent causes a still further decrease in molecular weight of the product as shown by lowered specific viscosity. Example 7 reveals that an increase in the amount of maleic anhydride charged without otherwise markedly changing the reaction variables, resulting in a 20 weight percent solids slurry as final product if all the maleic anhydride is converted to the copolymer, did not significantly change the properties of the product. The lowered yield is believed due to possibly poor agitation caused by the increased solids content. This was not present in a similar run wherein the solids content was 20 percent but the solvent was ethylene dichloride, as shown by Example 15. Examples 8 and 9 show that continued increase in the percentage aldehyde caused continued decrease in the specific viscosity of the polymer product, although the rate of decrease in specific viscosity of the product in going from 5 to 7 to 9 to 11 percent aldehyde in Examples 5, 6, 8 and 9 is not nearly so marked as the rate of decrease which occurred with incremental changes at the lower percentages of aldehyde.

Example 10, which can be compared with Example 2, shows that substitution of isobutyraldehyde for n-butyraldehyde does not significantly change the results obtained. Comparison of Example 18 with Example 16 shows the same to be true when ethylene dichloride is the solvent.

The ethylene dichloride control shows, on comparison with the benzene 80° C. control, that ethylene dichloride alone effects some lowering of molecular weight. Examples 11 to 18 show that when ethylene dichloride is employed as solvent the molecular weight of the product is about the same as that obtained with benzene as solvent, when the aldehyde is employed in similar concentration. Ethylene dichloride does appear to require somewhat more catalyst to obtain high yields. An important difference, not shown in the table, is that the product obtained when ethylene dichloride rather than benzene is used as solvent, has a much higher bulk density and does not have nearly as great a tendency towards dusting. These improved properties are believed to be the result of the greater non-solvent character of the ethylene dichloride for the polymer (i.e., the polymer is less swollen in the solvent than in benzene).

Example 11, on comparison with Example 8, shows that the product specific viscosity is not changed by the change in solvent although the yield is somewhat lowered. Example 12, by increasing the catalyst quantity one-half, namely from 0.5 to 0.75 mole percent benzoyl peroxide, resulted again in a high yield of product.

Examples 13 and 14 were run at 100 p.s.i.g., rather than the 200 p.s.i.g. used in all the other examples. Example 13 shows that the lowered pressure markedly dropped the yield, while Example 14 shows that this effect can be overcome and the yield brought back to near-quantitative by doubling the amount of catalyst. Examples 13 and 14 also show that the lower pressure permits the production of polymer product of still lower molecular weight, as shown by the specific viscosity.

Example 15 shows that an increase in the solids content of the reaction mixture to 20 percent, this being the theoretical solids content based on complete conversion maleic anhydride charged to ethylene/maleic anhydride copolymer, does not result in any significant change in the polymer molecular weight. It will also be noted that the yield was not decreased as was noted in Example 7, presumably because of the more readily stirrable form of the polymer when using ethylene dichloride as solvent.

Examples 16 and 17 demonstrate that aldehyde concentrations in the neighborhood of 10 weight percent give about the maximum regulating action in the preparation of ethylene/maleic anhydride copolymer, since the specific viscosities of the product obtained with 10.9 percent aldehyde (Example 16) and 18 percent aldehyde (Example 17) are very little lower than obtained with 9 percent aldehyde (Example 12).

All of the ethylene/maleic anhydride copolymers of Examples 1–18 are excellent thinners and deflocculants for aqueous base oil well drilling muds when added thereto at the rate of from 1 to 4 pounds of copolymer per 42-gallon barrel of mud.

EXAMPLES 19 TO 27

In the same apparatus and by the same procedure employed for Examples 1 to 18 two series of runs were made to evaluate the possibility of recycling unused n-butyraldehyde and solvent. The results of the two series of runs are given in Table II. The n-butyraldehyde was added only to the first run in each series. The polymerization was carried out as described above, the polymer product was recovered by filtration, and the next subsequent run of the series was made using the filtrate from the preceding run with sufficient ethylene dichloride solvent added to make up to volume. The power of this system to maintain the production of low molecular weight ethylene/maleic anhydride copolymer remained virtually constant through about four successive runs and then appeared to diminish at a slow rate. Reaction times were not adversely affected by this procedure. Also, if the polymer yield was low in one run, the yield was correspondingly high in the next, since unreacted maleic anhydride was also being recycled.

EXAMPLES 28–31

In the same apparatus and by the same general procedure employed for the earlier examples, propylene was copolymerized with maleic anhydride. Data are given in Table III.

Comparison of Examples 28 and 29 with the control reveals the much lower molecular weight (as indicated by specific viscosity) obtainable in the propylene/maleic anhydride copolymer through use of n-butyraldehyde. Examples 28 and 29 also show the effect of temperature on molecular weight. Examples 31 and 29 taken together show that substitution of benzene for ethylene dichloride does not greatly affect the results (the total weight of propylene fed in these two examples was about the same, and the pressure in Example 29 started above and ended below the pressure maintained in Example 31). The small amount of propylene used in Example 30 (with the correspondingly low pressure of 50 to 20 p.s.i.g.) resulted in a yield of only 52%, but the molecular weight was the lowest amongst the propylene/maleic anhydride examples. At otherwise the same conditions, increased propylene, and perhaps the increased catalyst, in Example 31 gave essentially theoretical yield.

The propylene/maleic anhydride copolymers of Examples 28–31 are excellent dispersants for pigments suspended in aqueous media. They are also excellent thinners and deflocculants for aqueous base drilling muds, such as those obtained by suspension of bentonite in water, with or without weighting materials such as barytes; the copolymers should be used in quantities of from 1 to 4 pounds per barrel of drilling mud.

*Table III*

PRODUCTION OF LOW MOLECULAR WEIGHT PROPYLENE/MALEIC ANHYDRIDE COPOLYMER WITH THE AID OF n-BUTYRALDEHYDE

| Example | n-Butyraldehyde, Mole Percent | Maleic Anhydride, grams | Propylene/MA, mole ratio | Propylene [1] | | Solvent, ml. | Benzoyl Peroxide, mole Percent | Temp., °C | PMA Copolymer | |
|---|---|---|---|---|---|---|---|---|---|---|
| | | | | grams | p.s.i.g. | | | | Yield, Percent | Sp. Visc. |
| | | | | | | Ethylene dichloride | | | | |
| Control | 0 | 196 | 2:1 | 168 | 90–40 | 1,600 | 0.25 | 70 | 98.3 | 0.64 |
| 28 | 9.6 | 196 | 2:1 | 168 | 70–25 | 1,600 | 0.25 | 70 | 90.4 | 0.28 |
| 29 | 9.6 | 196 | 2:1 | 168 | 95–50 | 1,600 | 0.25 | 80 | 99.2 | 0.22 |
| | | | | | | Benzene | | | | |
| 30 | 9.6 | 196 | 1.1:1 | 92 | 50–20 | 1,600 | 0.25 | 80 | 52.2 | 0.13 |
| 31 | 9.6 | 196 | 2.1:1 | 177 | 80 | 1,600 | 0.5 | 80 | 98.9 | 0.21 |

[1] In the Control and Examples 28, 29 and 30, the stated weight of propylene was charged initially and no other propylene was later added. In Example 31, propylene (amounting to a total of 177 g.) was charged periodically to maintain the stated pressure.

*Table II*

PRODUCTION OF LOW MOLECULAR WEIGHT ETHYLENE/MALEIC ANHYDRIDE COPOLYMER, WITH RECYCLE OF n-BUTYRALDEHYDE [1]

| Example | n-Butyraldehyde, Wt. Percent | EMA Copolymer | |
|---|---|---|---|
| | | Yield, Percent | Sp. Visc. |
| 19 | 9.0 | 99.6 | 0.090 |
| 20 | residue from Ex. 19 | 100 | 0.098 |
| 21 | residue from Ex. 20 | 100 | 0.103 |
| 22 | 9.0 | 99.6 | 0.101 |
| 23 | residue from Ex. 22 | | 0.102 |
| 24 | residue from Ex. 23 | 101.7 | 0.103 |
| 25 | residue from Ex. 24 | | 0.107 |
| 26 | residue from Ex. 25 | 96.5 | 0.120 |
| 27 | residue from Ex. 26 | 108.8 | 0.112 |

[1] Maleic anhydride 200 g. charged each example; ethylene 200 p.s.i.g.; ethylene dichloride 2089 ml. (filtrate plus make-up ethylene dichloride); reaction temperature 80° C.; benzoyl peroxide 0.75 mole percent charged each example.

EXAMPLES 32–35

Propylene and maleic anhydride were copolymerized as in Examples 28–31 in a series of tests showing the effect of varying the propylene/maleic anhydride ratio. An initial mole ratio was established in each test, and thereafter additional propylene was charged as needed to maintain the initial pressure. The data are given in Table IV, and show that decreasing the initial mole ratio, and hence the total mole ratio as well as the pressure maintained, resulted in a corresponding decrease in the molecular weight of the propylene/maleic anhydride copolymer product.

Table IV
EFFECT OF REDUCING PROPYLENE/MALEIC ANHYDRIDE RATIO

| Example | n-Butyraldehyde, mole Percent | Maleic Anhydride, grams | Propylene | | | Ethylene Dichloride, ml. | Benzoyl Peroxide, mole Percent | Temp., °C. | PMA Copolymer | |
| --- | --- | --- | --- | --- | --- | --- | --- | --- | --- | --- |
| | | | Initial Charge, g. | Initial P/MA, mole ratio | Pressure Maintained, p.s.i.g. | | | | Yield, Percent | Sp. Visc. |
| 32 | 9.75 | 147 | 126 | 2:1 | 120 | 1,200 | 0.75 | 80 | 100 | 0.30 |
| 33 | 9.75 | 196 | 84 | 1:1 | 73–82 | 1,600 | 0.75 | 80 | 94.7 | 0.21 |
| 34 | 9.75 | 147 | 48 | 0.75:1 | 50 | 1,200 | 0.75 | 80 | 93.2 | 0.18 |
| 35 | 9.75 | 196 | 42 | 0.5:1 | 40 | 1,600 | 0.75 | 80 | 97.6 | 0.16 |

EXAMPLES 36–40

In the same apparatus and by the same general procedure employed for the earlier examples, isobutylene was copolymerized with maleic anhydride in the presence of n-butyraldehyde. Data are presented in Table V. In each instance, the stated weight of isobutylene was charged initially, and no further isobutylene was charged during the run.

It is interesting to note that in Examples 37 and 38, in which neither reactant was present in excess, theoretical yields were nevertheless readily obtained. The data also show that the catalyst requirement for isobutylene/maleic anhydride copolymerization in the presence of n-butyraldehyde is quite low. Increasing the isobutylene (Example 36) to give an isobutylene:maleic anhydride mole ratio of 1.65:1 resulted in the production of copolymer of considerably higher molecular weight. It may also be noted that ethylene dichloride is a less desirable solvent than benzene in making isobutylene/maleic anhydride copolymer because the polymer is obtained in a swollen rubbery form. The opposite is true in making ethylene/maleic anhydride copolymer, which is obtained in a better, more dense physical form when ethylene dichloride is the solvent. Example 39 shows that lowering the amount of isobutylene lowers the molecular weight of the product. The increased amount of n-butyraldehyde in Example 40 resulted in the lowest molecular weight product, despite the fact that isobutylene was present in excess.

While the invention has been described with particular reference to preferred embodiments thereof, it will be appreciated that numerous modifications and variations are possible without departing from the invention in its broadest aspects.

I claim:

1. In the copolymerization of maleic anhydride with an olefin having from 2 to 4 carbon atoms with the aid of a free-radical promoting catalyst to form an olefin/maleic anhydride copolymer, the improvement which comprises effecting said copolymerization at a temperature within the range of 40 to 80° C. and in the presence of an aldehyde having the formula

wherein R is selected from the group consisting of hydrogen, hydrocarbon radicals, and aldehyde-substituted hydrocarbon radicals, said aldehyde being present in an amount within the range of 0.5 to 20 mole percent based on the reacting monomers.

2. In the copolymerization of maleic anhydride with ethylene with the aid of a free-radical promoting catalyst to form ethylene/maleic anhydride copolymer, the improvement which comprises effecting said copolymerization at a temperature within the range of 40 to 80° C. and in the presence of an aldehyde having the formula

Table V
PRODUCTION OF LOW MOLECULAR WEIGHT ISOBUTYLENE/MALEIC ANHYDRIDE COPOLYMER WITH THE AID OF n-BUTYRALDEHYDE

| Example | n-Butyraldehyde, mole percent | Maleic Anhydride, grams | Isobutylene, grams | Isobutylene/Maleic Anhydride, mole ratio | Solvent, ml. | | Benzoyl Peroxide, mole percent | Temp., °C. | IBMA Copolymer | |
| --- | --- | --- | --- | --- | --- | --- | --- | --- | --- | --- |
| | | | | | | | | | Yield, percent | Sp. Visc. |
| 36 | 9.6 | 196 | 185 | 1.65:1 | Ethylene dichloride | 1,600 | 0.25 | 80 | 98.7 | 1.49 |
| 37 | 9.6 | 196 | 112 | 1:1 | Benzene | 1,600 | 0.06 | 80 | 98.0 | 0.71 |
| 38 | 9.6 | 196 | 112 | 1:1 | | 1,600 | 0.03 | 80 | 100 | 0.77 |
| 39 | 9.6 | 196 | 70 | 0.63:1 | | 1,600 | 0.03 | 80 | [1] 99.3 | 0.56 |
| 40 | 19.2 | 196 | 125 | 1.17:1 | | 1,600 | 0.03 | 80 | 96.8 | 0.51 |

[1] In Example 39, yield is based on isobutylene, since the maleic anhydride was present in excess of the stoichiometric amount.

The isobutylene/maleic anhydride copolymer products of Examples 36–40 are all useful as sizes for textiles, especially rayon cloth. In this use the low molecular weights are advantageous in providing aqueous sizing solutions of sufficiently low viscosity to permit easy handling and a more uniform sizing than obtainable with isobutylene/maleic anhydride copolymers made under the same conditions but in the absence of the n-butyraldehyde.

wherein R is selected from the group consisting of hydrogen, hydrocarbon radicals, and aldehyde-substituted hydrocarbon radicals, said aldehyde being present in an amount within the range of 0.5 to 20 mole percent based on the reacting monomers.

3. In the copolymerization of maleic anhydride with propylene with the aid of a free-radical promoting catalyst to form propylene/maleic anhydride copolymer, the improvement which comprises effecting said copolymerization at a temperature within the range of 40 to 80° C. and in the presence of an aldehyde having the formula

wherein R is selected from the group consisting of hydrogen, hydrocarbon radicals, and aldehyde-substituted hydrocarbon radicals, said aldehyde being present in an amount within the range of 0.5 to 20 mole percent based on the reacting monomers.

4. In the copolymerization of maleic anhydride with isobutylene with the aid of a free-radical promoting catalyst to form isobutylene/maleic anhydride copolymer, the improvement which comprises effecting said copolymerization at a temperature within the range of 40 to 80° C. and in the presence of an aldehyde having the formula

wherein R is selected from the group consisting of hydrogen, hydrocarbon radicals, and aldehyde-substituted hydrocarbon radicals, said aldehyde being present in an amount within the range of 0.5 to 20 mole percent based on the reacting monomers.

5. In the copolymerization of ethylene with maleic anhydride with the aid of a free-radical promoting catalyst to form an ethylene/maleic anhydride copolymer, the improvement which comprises effecting said copolymerization at a temperature within the range of 40 to 80° C. and in the presence of an alkanal having at least one hydrogen atom on the α-carbon atom, said alkanal being present in an amount within the range of 0.5 to 20 mole percent based on the reacting monomers.

6. In the copolymerization of ethylene with maleic anhydride with the aid of a free-radical promoting catalyst to form an ethylene/maleic anhydride copolymer, the improvement which comprises effecting said copolymerization at a temperature within the range of 40 to 80° C. and in the presence of n-butyraldehyde in an amount within the range of 0.5 to 20 mole percent based on the reacting monomers.

7. In the copolymerization of ethylene with maleic anhydride with the aid of a free-radical promoting catalyst to form an ethylene/maleic anhydride copolymer, the improvement which comprises effecting said copolymerization at a temperature within the range of 40 to 80° C. and in the presence of isobutyraldehyde in an amount within the range of 0.5 to 20 mole percent based on the reacting monomers.

8. A process which comprises subjecting maleic anhydride maintained under an ethylene pressure of at least about 150 pounds per square inch and at a temperature within the range of 60 to 80° C. to polymerization with the aid of a peroxide catalyst present in an amount of at least 0.5 mole percent based on the reacting monomers plus an aldehyde having the formula

wherein R is selected from the group consisting of hydrogen, hydrocarbon radicals, and aldehyde-substituted hydrocarbon radicals, present in an amount of at least 3 mole percent based on the reacting monomers, continuing said polymerization conditions until essentially all the maleic anhydride has been copolymerized with ethylene, and recovering as a product of the process an ethylene/maleic anhydride copolymer in essentially theoretical yield and having a specific viscosity as determined in 1 weight percent solution in dimethylformamide at 25° C. of not in excess of about 0.2.

9. A process according to claim 8 in which said peroxide is benzoyl peroxide.

10. A process according to claim 8 in which said aldehyde is n-butyraldehyde.

11. A process according to claim 8 in which said copolymerization is effected in the presence of an aromatic hydrocarbon diluent.

12. A process according to claim 11 wherein said diluent is benzene.

13. A process according to claim 8 wherein said copolymerization is effected in the presence of a halogenated aliphatic hydrocarbon diluent.

14. A process for the production of low molecular weight ethylene/maleic anhydride copolymer in the form of non-agglomerated particles and having a specific viscosity as determined in 1 weight percent solution in dimethylformamide of about 0.1, which comprises subjecting maleic anhydride, ethylene, and a peroxide catalyst, dissolved in a liquid composed of a liquid chlorinated aliphatic hydrocarbon solvent and a liquid alkanal having at least one hydrogen atom on the α-carbon atom, to polymerization reaction at a temperature within the range of 60 to 80° C. while maintained at an ethylene pressure of from 100 to 200 pounds per square inch, said catalyst being present in an amount of at least 0.5 mole percent based on the reacting monomers and said alkanal being present in an amount of at least 6 mole percent based on the reacting monomers, separating resultant polymer particles from the liquid reaction medium, and returning thus-separated liquid to the polymerization where said aldehyde, unused catalyst, and any unreacted maleic anhydride take part in the polymerization reaction to produce more of said low molecular weight copolymer.

15. A process according to claim 14 in which chlorinated aliphatic hydrocarbon solvent is ethylene dichloride and said alkanal is a butyraldehyde.

16. A process which comprises subjecting maleic anhydride and isobutylene to copolymerization at a temperature within the range of 40 to 80° C. with the aid of a peroxide catalyst and in the presence of an aldehyde having the formula

wherein R is selected from the group consisting of hydrogen, hydrocarbon radicals, and aldehyde-substituted hydrocarbon radicals, present in an amount of at least 5 mole percent based on the reacting monomers, continuing said polymerization conditions until essentially all the monomer present in the lesser molar amount has been copolymerized, and recovering as a product of the process an isobutylene/maleic anhydride copolymer in essentially theoretical yield and having a specific viscosity as determined in 1 weight percent solution in dimethylformamide at 25° C. of not in excess of about 1.

17. A process which comprises subjecting maleic anhydride maintained under a propylene pressure of at least about 40 pounds per square inch and at a temperature within the range of 60 to 80° C. to polymerization with the aid of a peroxide catalyst present in an amount of at least 0.2 mole percent based on the reacting monomers plus an aldehyde having the formula

wherein R is selected from the group consisting of hydrogen, hydrocarbon radicals, and aldehyde-substituted hydrocarbon radicals, present in an amount of at least 5 mole percent based on the reacting monomers, continuing said polymerization conditions until essentially all the maleic anhydride has been copolymerized with propylene, and recovering as a product of the process a propylene/maleic anhydride copolymer in essentially theoretical yield and having a specific viscosity as determined in 1 weight percent solution in dimethylformamide at 25° C. of not in excess of about 0.4.

(References on following page)

References Cited in the file of this patent

UNITED STATES PATENTS

| | | |
|---|---|---|
| 2,373,561 | Hanford | Apr. 10, 1945 |
| 2,378,629 | Hanford | June 19, 1949 |
| 2,576,370 | Tawney | Nov. 27, 1951 |
| 2,599,119 | McQueen | June 3, 1952 |
| 2,616,887 | Danzig et al. | Nov. 4, 1952 |
| 2,675,370 | Barrett | Apr. 13, 1954 |
| 2,721,879 | Popkin et al. | Oct. 25, 1955 |

OTHER REFERENCES

Kapur: Journal of Polymer Science, vol. XI, No. 5, pp. 399–408 (1954).

Schildknecht: Polymer Processes, Interscience, 1956, pp. 177–181.

Gregg et al.: J. Am. Chem. Soc., vol. 75, 1953, pp. 3530–3533.